N. S. WILLIAMS.
METALLIC PACKING FOR PISTONS.
APPLICATION FILED FEB. 1, 1918.
1,288,343.
Patented Dec. 17, 1918.
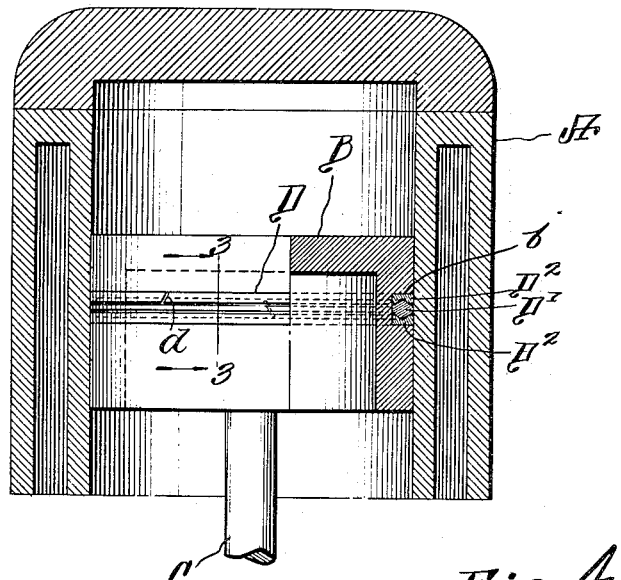
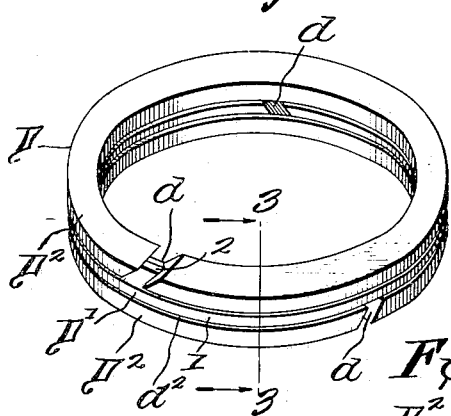
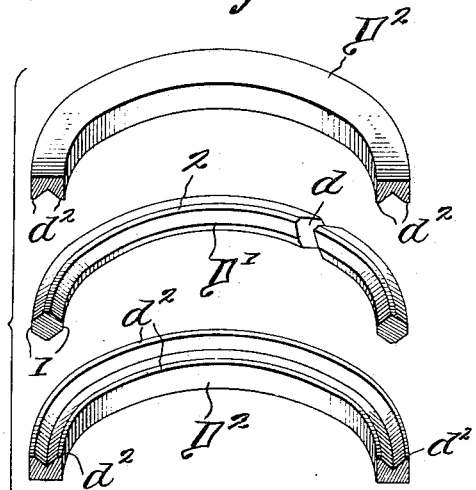
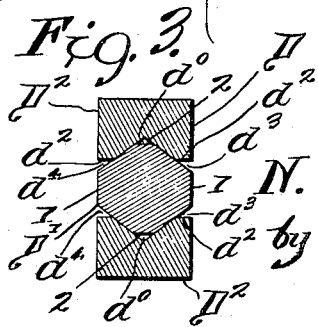
Witness
Edwin J. Beller.
Inventor
N. S. Williams.
by F. E. Hunter,
Attorney.

UNITED STATES PATENT OFFICE.

NOLAN S. WILLIAMS, OF EL PASO, TEXAS, ASSIGNOR TO VICTORY PISTON RING MFG. CO., OF EL PASO, TEXAS.

METALLIC PACKING FOR PISTONS.

1,288,343.     Specification of Letters Patent.     Patented Dec. 17, 1918.

Application filed February 1, 1918. Serial No. 214,880.

*To all whom it may concern:*

Be it known that I, NOLAN S. WILLIAMS, a citizen of the United States, residing at El Paso, in the county of El Paso and State of Texas, have invented certain new and useful Improvements in Metallic Packings for Pistons; and I do hereby declare the following to be a full, clear, and exact description of the invention, such as will enable others skilled in the art to which it appertains to make and use the same.

My invention relates to improvements in metallic packing for pistons, and is especially intended to provide a metallic packing for small high speed pistons for internal combustion engines, such as are used in automobiles.

This metallic packing is composed of three concentric rings which acting in unison in the channel of the piston form a complete ring.

The middle ring is a double wedge, sloping at variable angles toward the inner and outer circumferences of the ring. It is made so that when compressed to enter the cylinder it has a tendency to expand radially to the cylinder walls.

The two side edges of the middle ring are cut away so that, when the parts are all assembled, a channel may be provided for the accumulation of oil or other lubricant which finds its way outward between the rings, while its outer edges are cut away to form a cylindrical surface to fit snugly in the cylinder; the inner edges are also cut away to slip over the piston and snap into the groove therein.

The two outer rings are cut with angles corresponding to the inclines of the center ring and are also made so that when compressed to enter the cylinder they too have a tendency to expand radially to the cylinder walls.

The sides of these outer rings next the middle ring are in the form of V-shaped annular troughs engaging the inner ring, thus the three rings are locked together to form a complete radially expansible packing; and the edges of these troughs are flattened to provide grooves for receiving oil or other lubricant.

The invention is especially intended to provide a compound packing ring which as a whole has equal radial expansion throughout its circumference, and is provided with two sets of oil grooves through which lubrication is effected.

The oil issuing radially of the ring from these grooves forms two oil packing rings, each of which serves to prevent the passage of gas from the pressure side of the piston to the opposite side thereof during each stroke of the piston.

My invention will be understood by reference to the accompanying drawings, in which:

Figure 1 shows a central section through one end of the cylinder, showing the piston partly in section and partly in elevation.

Fig. 2 is a perspective view showing the packing ring detached.

Fig. 3 shows a cross section through the packing ring along the line 3—3 of Figs. 1 and 2, and looking in the direction of the arrows, the parts being shown on a larger scale than in the other figures; and Fig. 4 shows parts of the three broken rings which constitute the packing ring comprising my invention.

A represents the cylinder, which may be of the usual or preferred construction, B represents the piston, C the piston rod, D represents the packing ring which is composed of three broken rings with the breaks $d$ staggered as shown in Fig. 2. These breaks are preferably cut at an angle relative to the axis of the ring, as shown at $d$ in Fig. 2, to prevent scoring the cylinder.

The middle ring $D'$ is double wedge-shaped, or diamond shaped, with the four corners cut away, in cross section, as shown in Fig. 3.

It is flattened on opposite sides next to and farthest from the inner wall of the cylinder, as shown at $l$. It is also flattened at the top and bottom where the sides converge, as shown at 2.

The outer rings $D^2$, $D^2$ have V-shaped grooves cut in them to fit the plane sides of the inner ring and leave passages $d^0$ into which some of the lubricant used in the cylinder collects.

The side rings $D^2$ are also cut away, or flattened, as at $d^2$, to provide grooves $d^3$ and $d^4$ to receive and distribute oil or other lubricant.

These rings $D'$ and $D^2$ are preferably made of spring steel, and when distended are of greater diameter than the cylinder in which they will tend to spring outward and at all times form a tight joint.

In order to assemble the parts, assemble the ring members $D^2$, DI, $D^2$ in the position shown in Fig. 2, except that the cuts $d$ should all register, or approximately register, together; then the ring may be expanded like a single split ring to slip over the piston B and snap into the ring channel $b$ provided in said piston. Now by sliding the outer ring members $D^2$ through an arc of approximately 120°, in reverse directions, relative to the middle ring member $D'$, the ring members are securely locked together, and a smooth contact with the cylinder walls is secured.

Thus it will be seen that, when in this position, the inner bevel faces of the outer ring members, engaging the inner bevel faces of the middle ring member, will hold the outer ring members from being accidentally displaced outward; while the outer bevel faces of the outer ring members, engaging the outer bevel faces of the middle ring member, will prevent the middle ring member from being accidentally displaced outward; and thus these three ring members will positively interlock and prevent accidental displacement outward of any one of the ring members, and yet will permit the desired expansion and contraction of the packing ring as a whole.

The action of the ring when properly placed in the ring channel and thereafter entered into the cylinder is for the middle ring in exercising radial expansion, to force apart the two outer rings in the ring channel.

The action of the outer rings when properly placed in the ring channel and thereafter entered into the cylinder is that each ring exercising radial expansion will, by its lower bevel operating against the corresponding lower bevel of the middle ring, accelerate the lateral expansion of the ring as a whole.

The middle ring is made so that the outer edges thereof do not exactly fit into the grooves of the outer rings and thus make a channel which carries the oil, assuring satisfactory lubrication for the ring.

Thus the oil or other lubricant accumulates in the passages $d^3$ $d^0$ and $d^4$, and as the piston reciprocates this oil is squeezed out radially from the grooves $d^4$ toward the inner wall of the cylinder, forming in effect two oil packing rings which tend not only to keep the cylinder lubricated, but also serve to prevent the escape of gas from the pressure side of the piston to the exhaust side thereof.

The opening of the middle ring is slightly greater than that of the outer rings, in this way according it slightly greater radial contractibility, and hence greater expansibility when compressed.

It will be seen that the packing ring automatically adjusts itself for wear and may be readily inserted and replaced when desired, and does not burn out, and assists in keeping the cylinder clean.

Having thus described my invention, what I claim as new and desire to secure by Letters Patent of the United States is:—

1. A metallic piston packing comprising a middle split ring substantially diamond shaped in cross section, the said middle ring having its outer face flattened and bearing directly against the inner wall of the cylinder, and two outer split rings each provided with a V-shaped groove adapted to engage the bevel sides of the middle ring, and the outer walls of said V-shaped grooves being flattened to provide oil grooves, the three rings together forming a substantially cylindrical ring adapted to fit snugly in the ring channel of the piston, substantially as described.

2. A metallic piston packing comprising a middle split ring substantially diamond shaped in cross section, but with the four angles of the diamond flattened, the outer flattened face of said middle ring bearing directly against the inner wall of the cylinder, and the two outer split rings each provided with a V-shaped groove adapted to engage the bevel sides of the middle ring, and the outer walls of said V-shaped grooves being flattened to provide oil grooves, the three rings together forming a substantially cylindrical ring adapted to fit snugly in the ring channel of the piston, substantially as described.

3. A metallic piston packing comprising a middle split ring substantially diamond shaped in cross section, the said middle ring having its outer face flattened and bearing directly against the inner wall of the cylinder, and two outer split rings each provided with a V-shaped groove adapted to engage the bevel sides of the middle ring, and the outer walls of said V-shaped grooves being flattened to provide oil grooves, the three rings together forming a substantially cylindrical ring adapted to fit snugly in the ring channel of the piston, the split in the middle ring being wider than that in the two side rings, substantially as described.

4. A metallic piston packing comprising a middle split ring substantially diamond shaped in cross section, but with the four angles of the diamond flattened, the outer flattened face of said middle ring bearing directly against the inner wall of the cylinder, and two outer split rings each provided with a V-shaped groove adapted to engage the bevel sides of the middle ring, and the outer walls of said V-shaped grooves being flattened to provide oil grooves, the three rings together forming a substantially cylindrical ring adapted to fit snugly in the ring channel of the piston, the split in the middle ring being wider than that in th two side rings, substantially as described.

5. A metallic piston packing comprising a middle split ring substantially diamond shaped in cross section, the said middle ring having its outer face flattened and bearing directly against the inner wall of the cylinder, and two outer split rings each provided with a V-shaped groove adapted to engage the bevel sides of the middle ring, and the outer walls of said V-shaped grooves being flattened to provide oil grooves, the three rings together forming a substantially cylindrical ring adapted to fit snugly in the ring channel of the piston, and the splits in the three rings being staggered whereby the three rings are held positively locked together, but are free to expand circumferentially, substantially as described.

6. A metallic piston packing comprising a middle split ring substantially diamond shaped in cross section, but with the four angles of the diamond flattened, the outer flattened face of said middle ring bearing directly against the inner wall of the cylinder, and two outer split rings each provided with a V-shaped groove adapted to engage the bevel sides of the middle ring, and the outer walls of said V-shaped grooves being flattened to provide oil grooves, the three rings together forming a substantially cylindrical ring adapted to fit snugly in the ring channel of the piston, and the splits in the three rings being staggered whereby the three rings are held positively locked together, but are free to expand circumferentially, substantially as described.

In testimony whereof, I affix my signature.

NOLAN S. WILLIAMS.